US008123854B2

(12) United States Patent
Cassat et al.

(10) Patent No.: US 8,123,854 B2
(45) Date of Patent: Feb. 28, 2012

(54) METHOD OF TREATING MARINE SEDIMENTS AND USE OF THE RESULTING SOLID PRODUCT IN MORTARS OR CONCRETES

(75) Inventors: Pierre Cassat, Le Mesnil Simon (FR); Emmanuel Moudilou, Carrieres Sous Poissy (FR); Bruno le Rolland, Oinville sur Montcient (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 13/058,386

(22) PCT Filed: Sep. 29, 2009

(86) PCT No.: PCT/EP2009/062593
§ 371 (c)(1),
(2), (4) Date: Mar. 18, 2011

(87) PCT Pub. No.: WO2010/043495
PCT Pub. Date: Apr. 22, 2010

(65) Prior Publication Data
US 2011/0185950 A1      Aug. 4, 2011

(30) Foreign Application Priority Data

Oct. 17, 2008   (FR) ..................................... 08 57052

(51) Int. Cl.
*C04B 28/06*   (2006.01)
*C04B 18/02*   (2006.01)
*C04B 28/04*   (2006.01)
*C04B 28/14*   (2006.01)

(52) U.S. Cl. ......... 106/694; 106/692; 106/693; 106/811

(58) Field of Classification Search .................. 106/694, 106/811, 692, 693
See application file for complete search history.

(56) References Cited

U.S. PATENT DOCUMENTS

2004/0158114 A1    8/2004   Kozlova et al.

FOREIGN PATENT DOCUMENTS

| DE | 4206900 A1 | 9/1993 |
| EP | 0 120 097 A | 10/1984 |
| EP | 1561733 A | 8/2005 |
| WO | 2007097435 A | 8/2007 |

OTHER PUBLICATIONS

Derwent-Acc-No: 2010-D18437, abstract of Brazil Patent Specification No. BR-200801704A2 (Feb. 2010).*
Suzuki, K. et al: "Solidification of a sludge containing heavy metal compounds and large quantities of organic substances", Chemical Abstracts, May 4, 1981, p. 307, vol. 94, No. 18, XP000184562.
Takano, Y. et al: "Rapid-setting soil strengthening agents" Chemical Abstracts, Oct. 1, 1990, p. 302, vol. 113, No. 14, XP000190625.
Matsuda, T. et al: "Dewatering and solidifying of water-containing sludges", Chemical Abstracts, Dec. 30, 1985, p. 300, vol. 103, No. 26, XP000184298.
Nakado, A. et al: "Expansibe solidfying materials for soils", Chemical Abstracts, Sep. 22, 1980, p. 281, vol. 93, No. 12, XP000125010.
International Search Report, dated Feb. 23, 2010, in PCT/EP2009/062593.

* cited by examiner

*Primary Examiner* — Anthony J Green
(74) *Attorney, Agent, or Firm* — Young & Thompson (57) ABSTRACT

A method of treating marine or river dredging sediments, especially harbour zone sediments, whose free water content is between 40% and 80% by weight, for the purpose of obtaining a solid material which is easy to handle, includes the following successive steps: mixing the sediments with a treatment composition including a sulphoaluminate binder and at least one other component selected from a sulphate source and a catalyst of the hydration reactions of the sulphoaluminate binder; a step of setting of the mixture, leading to a compact mixture having a free water content of less than 20% by weight; then fractionating the compact mixture. The sediment thus treated may be incorporated into concrete or mortar formulas, which then have leachable fractions of less than 1% by weight.

24 Claims, 4 Drawing Sheets

METHOD OF TREATING MARINE SEDIMENTS AND USE OF THE RESULTING SOLID PRODUCT IN MORTARS OR CONCRETES

The present invention relates to a method of treating marine or river dredging sediments, especially harbour zone sediments, for the purpose of solidifying them, and also to the use, in mortars or concretes, of the solid material thus obtained.

Harbour estuaries are becoming more and more encumbered with marine sediments, which block them and which give rise to an accumulation of potentially toxic substances. Environmental regulations (GEODE, London Convention) prohibit these polluted sediments being discharged in to the sea, and oblige harbour authorities to deposit and treat these materials on land.

However, the very high fluidity of these materials in the crude state (they contain, indeed, from 40% to 80% of seawater) makes it very difficult to handle them and to treat them on land. Moreover, these sediments may contain large amounts of heavy metals, particularly of arsenic, chromium and lead, and also of zinc, copper, cadmium and mercury, in amounts of the order of several tens of milligrams/kg of solid dry matter of said sediment. These sediments may also contain PCBs. Their particle size is very fine, less than a millimetre, with their average particle size very often being close to a few tens of micrometres.

Since the marine sediments cannot be immersed in the sea, especially when they are polluted, various methods of treating these sediments have been envisaged, intended in particular to convert the crude polluted sediment in the liquid state into a material which is more solid and is therefore easy to handle.

One of the most commonly used treatments at present is treatment by reaction with quick lime. This is because the lime reacts instantaneously, and very exothermically, with the water present in the sediment (the increase in temperature may reach 140° C.), to form portlandite $Ca(OH)_2$. The removal of the free water from the sediment that accompanies the production of this precipitate, and the evaporation of the free water caused by the exothermy, lead to partial drying of the sediment and hence to its greater manoeuvrability.

For example, treatment of a marine sediment with quick lime at a concentration of approximately 20% allows the sediment to be made very rapidly capable of being handled, in less than two hours, indeed. However, after these two hours, there is little change, or none at all, in its texture.

Furthermore, quick lime is an extremely dangerous product, since it is converted to slaked lime by a violent and dangerous process. It must therefore be transported and used with precaution. The heat given off is such that, when it is extinguished, the water may begin to boil and project the lime, which is corrosive. In the context of the new European chemical regulation REACH, quick lime (or fat lime) may fall within the classification of substances which are dangerous or for which, at the least, the manufacturer is required to demonstrate that it can be used in a safe manner.

Following treatment with the lime, the treated sediment is generally discharged to landfill, without being utilized.

As was observed earlier, the dredging sediments, especially those obtained from harbour zones, contain high levels of heavy metals. Accordingly, the sediments treated with lime, when subjected to leaching, have large soluble fractions and may release the heavy metals over time. They must therefore be sent to special landfills (ultimate waste storage centres).

There is therefore a genuine need to provide methods of treatment which on the one hand employ treatment compositions that are less dangerous to use than quick lime and on the other hand allow treated sediments to be obtained that are resistant to leaching, primarily of the heavy metals.

The present invention accordingly provides a method of treating marine or river dredging sediments, especially harbour zone sediments, whose free water content is between 40% and 80% by weight, for the purpose of obtaining a solid material which is easy to handle, which is characterized in that it comprises the following successive steps:

mixing said sediments with a treatment composition comprising a sulphoaluminate binder and at least one other component selected from a sulphate source and a catalyst of the hydration reactions of the sulphoaluminate binder, a step of setting said mixture, leading to a compact mixture having a free water content of less than 20% by weight, then fractionating said compact mixture.

The treatment composition may comprise:
a sulphoaluminate binder and a sulphate source, or
a sulphoaluminate binder and a catalyst of the hydration reactions of said sulphoaluminate binder, or
a sulphoaluminate binder, a sulphate source and a catalyst of the hydration reactions of said sulphoaluminate binder.

In this method according to the invention, the treatment composition comprising a sulphoaluminate binder and a sulphate source and also an optional catalyst is a composition which is less dangerous to use than quick lime. This composition may be employed with the sediment in a simple procedure which involves simply mixing the sediments with said composition at ambient temperature. The setting step is a step of resting the mixture, during which the sulphoaluminate binder undergoes hydration in the presence of the large amount of free water in the dredging sediment.

Accordingly, after a setting step with a duration of between approximately 1 and 7 days, a solid, dried-out, compact mixture is obtained which has a free water content reduced relative to the initial sediment. This free water content is generally less than 20% by weight and may even reach only 10% by weight of the total mixture.

Lastly, this compact mixture is fractionated for subsequent use (shoveling or other use).

The sulphoaluminate binder is preferably a sulphoaluminate clinker comprising ye'elimite C4 A3 $ as the major phase (in percent by weight). By sulphoaluminate clinker is meant any material resulting from the calcining, at a temperature of between 900° C. and 1450° C. (clinkerization temperature), of mixtures containing at least one source of lime (for example limestones which have a CaO content of between 50% and 60%), at least one source of alumina (for example bauxites, calcined aluminas or other manufacturing byproducts containing alumina) and at least one source of sulphate (gypsums, chemical gypsum, natural or synthetic anhydrite, plaster, sulphocalcic ash). The sulphoaluminate clinker used in the present invention preferably has a $4CaO.3Al_2O_3.SO_3$ (also referenced C4 A3 $) content of more than 30%.

In the cement jargon, the primary compounds are represented by C for CaO, S for $SiO_2$, A for $Al_2O_3$, $ for $SO_3$, H for $H_2O$, and these will be used throughout the present text.

Advantageously this sulphoaluminate clinker contains from 40% to 80% by weight of ye'elimite C4 A3 $, from 5% to 15% by weight of C$ and from 15% to 25% by weight of belite C2S.

With regard to the sulphate source, it is preferred to use a calcium sulphate selected from anhydrite, gypsum or bassanite (calcium sulphate hemihydrate), which are setting regulators that react with the C4 A3 $ phase of the sulphoaluminate clinker to form ettringite.

The catalyst makes it possible to accelerate the hydration reactions of the sulphoaluminate binder. In the absence of the catalyst, hydration does take place, but it is very slow and not very advanced. This catalyst is preferably a lithium salt, advantageously a soluble salt, selected from lithium carbonate, sulphate or nitrate.

The advantageous treatment compositions comprise, in percent by weight:
from 49% to 90%, preferably from 80% to 90%, of sulphoaluminate clinker
from 9% to 51%, preferably from 12% to 20%, of calcium sulphate
up to 1%, preferably from 0.20% to 0.90%, of a lithium salt.

It has emerged, surprisingly, that a treatment composition of this kind, when added to said sediment in proportions of between 1% and 20% by weight of said sediment, provides substantial drying-out of the dredging sediment and also a solidification which allows easy handling.

Preferred proportions of this composition that are added to the sediments are between 2% and 15% by weight of said sediment, and advantageous results have even been observed for values of less than 8% by weight.

The treatment composition may further comprise, in addition to the sulphoaluminate binder, the sulphate source and the catalyst as mentioned above, constituting its "active principle", a hydraulic binder selected from Portland cement (cement standardized in accordance with standard NF EN 197-1 (of type I, II, III, IV and V)), a fat lime, a natural hydraulic lime or an artificial hydraulic lime, or a mixture of these binders. The proportion of this further binder in the treatment composition should not, however, exceed preferably 35% by weight, in order to give an acceptable texture.

A mixture of this kind, constituting a "dilution" of the "active principle", may exhibit good efficacy, for obtaining a solid material which is easy to handle, but generally less than without dilution.

In the method according to the invention, and after a step of setting and drying with a duration of between 1 and 7 days approximately, the treated sediment may be present, after fractionation, in the form of solid granules which contain a free water content of less than 20% by weight, preferably less than 10% by weight. The texture of the treated sediment is measured by means of a texturometer (particularly a TA.XT+ texture analyser, for example, an instrument developed by the company STABLE MICRO SYSTEMS), equipped with a 3 mm$^2$ cylindrical probe. The texture corresponds to the force required to cause the probe to penetrate to a given depth with a given speed (the depth and speed being identical for each sample tested, in this case of 10 mm at 1 mm/min). The sediment treated by the method according to the invention gives a force value of at least 10 newtons, preferably at least 15 newtons.

Thus, the resistance to penetration by the cylindrical probe of the texturometer is greater with the treated sediment than with the crude sediment, for which the value is close to 0 newtons. This measurement, using a texturometer, therefore makes it possible to have a quantitative estimation of the "solid" character of the treated sediment, and to quantify this solidification by the measurement of the intensity of the corresponding force.

It has been found, moreover, surprisingly that the treated sediment may be subsequently introduced into a concrete or mortar composition, even if the initial crude sediment contained a high level of chlorides (especially when the sediment is a sediment of marine origin, such as harbour dredging sediments).

The present invention accordingly also relates to a concrete or mortar incorporating a sediment treated in accordance with the above-described method according to the invention. In particular the concrete or mortar may contain up to 50% by weight of treated sediments. For example, it may be prepared from 10% to 30% by weight of treated sediment and from a CEM III cement, and then has a leachable fraction, determined in accordance with standard NF EN ISO 12457-2, of less than 1% by weight.

Tests were carried out to ascertain that the three types of blast furnace cements CEM III (mainly A, B and C, from the European cements standard NF EN 197-1) are suitable for preparing such concretes or mortars. This is because these cements contain different percentages of blast furnace slag.

The CEM III/A cement contains from 36% to 65% of slag and from 35% to 64% of clinker, the CEM III/B from 66% to 80% of slag and from 20% to 34% of clinker, and the CEM III/C from 81% to 95% of slag and from 5% to 19% of clinker.

Concretes were manufactured with proportions of between 200 and 500 kg/m$^3$ of a CEM III cement of this kind, in the presence of 10% to 50% of sediments treated by the method according to the present invention.

It has been noted that concretes or mortars of this kind perform substantial trapping of the soluble fraction, in other words the leachable fraction according to the aforementioned standard.

The method according to the invention therefore makes it possible to render inert (in other words, to immobilize) the heavy metals contained in the crude dredging sediment.

BRIEF DESCRIPTION OF THE DRAWINGS

The river or marine dredging sediments thus treated may therefore be easily recycled (for example into concretes, road platforms or embankments).

The present invention will be illustrated by non-limiting examples, referring to the figures, in which.

In the examples below the method according to the present invention or according to the prior art, starting from the sediment, was employed.

1—Characterization of the Polluted Marine Sediment

The test marine sediment was a sediment removed by pumping from the French port of Dunkirk. Its physicochemical characteristics are as follows:
water content: 71.2% by weight
density: 1.36 kg/m$^3$
dynamic viscosity: 90 mPa·s (for comparison: close to that of olive oil=100 mPa·s)

elemental chemical composition of the dry matter (DM), measured by X-ray fluorescence—see Table 1, elemental analysis (% by weight), below:

TABLE 1

| Element | Amounts (in % of DM) |
| --- | --- |
| Loss on ignition (950° C.) | 32.28% |
| $SiO_2$ | 32.08% |
| CaO | 16.95% |
| $Al_2O_3$ | 6.85% |
| $Na_2O$ | 4.31% |
| $Fe_2O_3$ | 2.85% |
| MgO | 1.88% |
| $K_2O$ | 1.33% |
| $SO_3$ | 0.73% |
| $TiO_2$ | 0.38% |
| $P_2O_5$ | 0.23% |
| MnO | 0.05% |
| SrO | 0.03% |
| Total + LOI | 99.95% | other elements assayed—see Table 2

TABLE 2

| Element | Amounts (in % of DM) |
| --- | --- |
| $S_{total}$ | 0.54% |
| Cl | 4.17% |
| $C_{total}$ | 5.59% |
| $C_{mineral}$ | 3.60% |
| $C_{organic}$ | 1.99% |
| Organic matter | 3.5% | amounts of heavy metals and PCBs—see Table 3

TABLE 3

| Element | Amounts (in mg/kg of DM) |
| --- | --- |
| As | 25 |
| Cd | 2 |
| Cr | 72 |
| Cu | 232 |
| Hg | <3 |
| Ni | 18 |
| Pb | 650 |
| Zn | 430 |
| Total PCBs | 0.082 | mineralogical composition—see Table 4

TABLE 4

Figure 1:
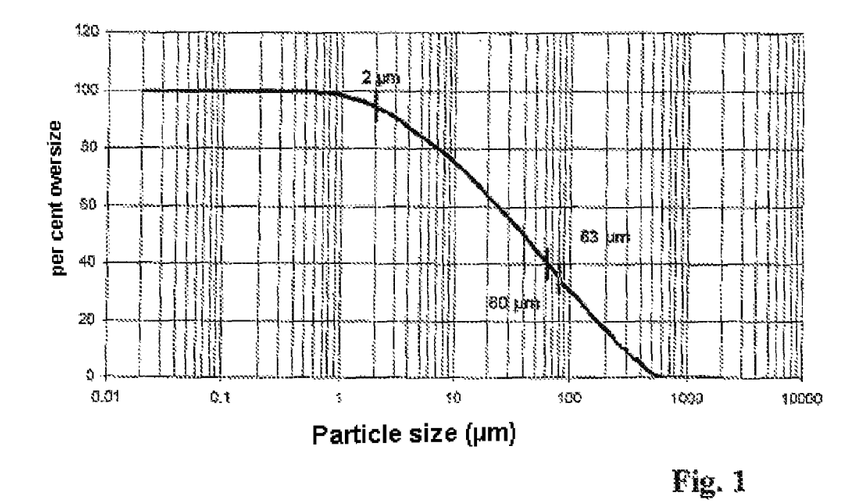
FIG. 1 shows the particle size analysis of the test dredging sediment.

| Mineral | Formula | Amounts |
| --- | --- | --- |
| calcite | $CaCO_3$ | 30% |
| quartz | $SiO_2$ | 30% |
| muscovite | $KAl_2(Si_3Al)O_{10}(OH,F)_2$ | 10% |
| halite | NaCl | 10% |
| syngenite | $K_2Ca(SO_4)_2 \cdot H_2O$ | <5% |
| orthoclase | $KAlSi_3O_8$ | <5% |
| mullite | $Al_2(Al_{2.8}Si_{1.2})O_{9.6}$ | <5% |
| albite | $NaAlSi_3O_8$ | <5% |
| microcline | $KAlSi_3O_8$ | <5% |
| smectite kaolinite | Al—Si—O—OH—$H_2O$ | <5% | granulometry:

Laser particle size analysis of the sediment in ethanol is shown in FIG. 1, and hence the following main characteristics are apparent:

$d_{0.1} = 3.2$ µm $d_{0.5} = 40$ µm $d_{0.9} = 294$ µm

The sediment under study is therefore an ultrafine sediment, characterized by the following solid fractions:

clayey fraction<2 µm: 5%
loams (between 2 and 63 µm): 55%
sandy fraction>63 µm: 40%

2—Block Diagram of the Method According to the Invention

Figure 2:
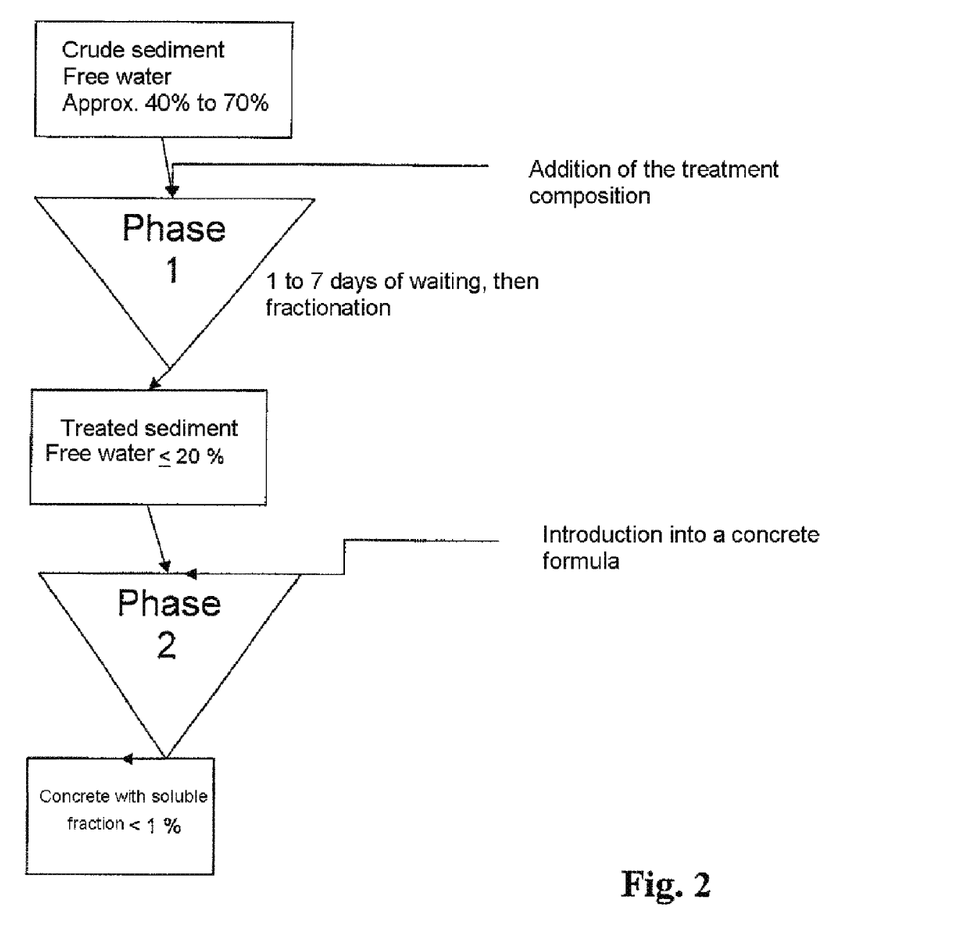
FIG. 2 is a block diagram of the method according to the invention.

The method according to the invention was applied to the sediment shown above in accordance with the successive steps shown diagrammatically in FIG. 2.

The ultimate objective of the method (phase 1+phase 2) was to obtain a material which meets the requirements of mechanical strength and leaching of the concrete, with a soluble fraction (that part of the material which is soluble in water after the leaching test according to standard NF EN ISO 12457-2) of less than 1% by weight.

3—Measurements Carried Out

On the treated sediment, the "texture" was measured by the procedure below.

Texture is one of the four criteria associated with the features of food products. This analysis of the texture allows an objective measurement by a mechanical test.

This measurement was applied to the sediments treated with the treatment composition in order to verify their solid state, and at the same time quantifying said state. The texturometer used is a TA.XT plus texture analyser instrument developed by the STABLE MICRO SYSTEMS company.

The principle used, in the context of the present invention, is that of measurement by the force (in newtons) opposed to the driven penetration of a probe into the material. The probe in this case is a cylindrical probe with a contact surface area of 3 $mm^2$. This probe is driven into the material (application of a force) and the instrument measures the force opposed to this pressure, and the plot made indicates the resulting force in newtons.

In the examples shown, the variation in this force was measured primarily as a function of time, in order to make comparisons between the samples tested.

EXAMPLE 1 (COMPARATIVE)

Treatment of the Sediment with Quick Lime

After the sludge in the harbour zone has been pumped, the alternative to releasing this sediment into the open sea is to treat it with quick lime.

Quick lime reacts immediately and very exothermically with the water present in the sediment, with a large increase in temperature, according to the reaction $CaO+H_2O \rightarrow Ca(OH)_2$ (portlandite). The removal of the free water from the sediment relative to the formation of this precipitate and the evaporation of the free water due to the exothermic reaction implies a "partial drying" of the sludge and hence a greater manoeuvrability.

A "reference synthetic" lime was therefore made, so as to have a formulation reference point, chemical stability and reproducibility of tests. This lime is prepared by decarbonation of calcium carbonate for 24 h. The preparation protocol involves placing said calcium carbonate in alumina crucibles. Following calcining at 950° C., when the crucibles have cooled to a temperature of 100 to 200° C., the quick lime is placed in a desiccator until the temperature of the lime is close to ambient temperature. The quick lime is then removed from the desiccator and screened to 40 µm, and finally is placed in a hermetically closed bag, which itself is introduced into a bag of the same kind, in order to ensure the best keeping properties and to prevent its hydration.

We carried out treatment of the sediment containing 60% of seawater with 20% of quick lime thus prepared, in phase 1 of the protocol described in section 2 above. The consistency of the treated sediment was measured using the texturometer as described in section 3 above.

It is apparent that the solid material obtained contains inclusions of unreacted lime. The reaction when the lime and sediment are mixed is highly exothermic. Between 1 h and 2 h, the lime begins to modify the sediment, which becomes more consistent and fairly malleable, with an appearance similar to that of a modelling clay. This consistency was not subsequently modified.

Figure 4:
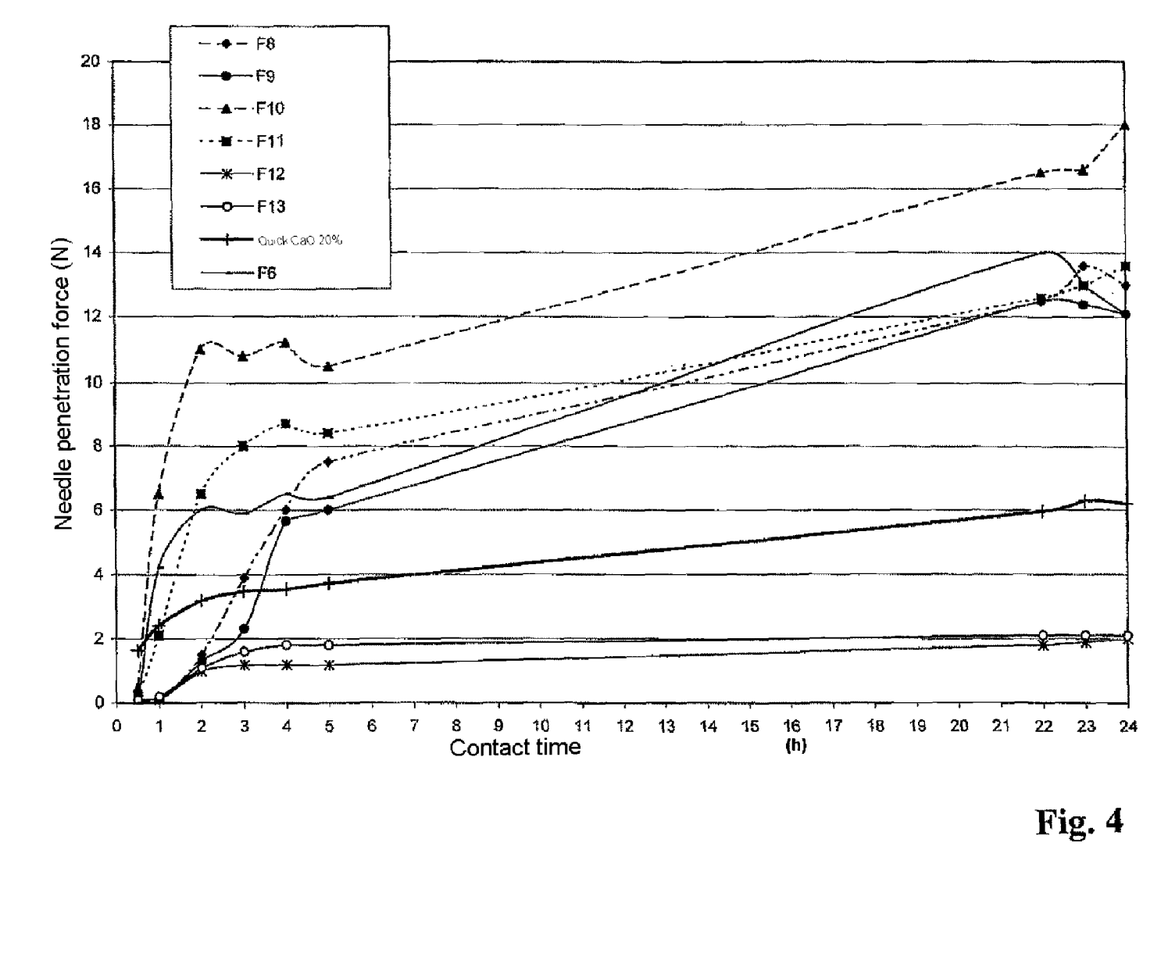
FIG. 4 is a collection of plots showing the comparative development of texture (force in newtons) of a sediment treated with different treatment compositions, as a function of contact time.

The results shown in FIG. 4 (the plot in the thickest line) show, as a function of time, the change in the texture of this sample of sediment treated with quick lime (CaO).

The quick lime treatment (at a concentration of 20%) of this sample of marine sediment renders it rapidly more manipulable (close to 4 newtons in less than 3 hours). However, its texture thereafter shows little change over time, reaching a maximum value of close to 6 newtons.

EXAMPLE 2

Treatment of the Sediment According to the Invention—Composition F11

The treatment composition developed here first makes it possible to avoid the dangers of use which are inherent in quick lime. The treatment, of the same sediment sample as that in Example 1, is carried out using 7% of a composition F11 comprising:
- 84.9% of sulphoaluminate clinker (containing approximately 65% of calcium sulphoaluminate $C_4A_3\$$, 15% of C\$ and 20% of belite $C_2S$)
- 15% of anhydrite
- 0.1% of lithium carbonate Treatment composition F11 is added to the sediments placed in the base of the vessel of a mill. Milling is started immediately, followed by a rest time of 30 s, and by milling again for 30 s.

The measurements with the texturometer are made immediately after the end of milling, taking as time zero the time corresponding to the contacting of the composition with the sediment (see FIG. 4). The texture is then measured at different intervals.

It is found that the sediment thus treated has a capacity to dry very rapidly.

The very rapid hydration of the calcium sulphoaluminate ($C_4A_3\$$) making up the clinker leads to the formation of hydrated trisulphoaluminate, called ettringite, which contributes to the adsorption of a corresponding amount of water, according to the following equation:

$$C_4A_3\$ + 2C\$ + 38H \rightarrow C_6A\$_3H_{32} + 2AH_3$$

Figure 3:
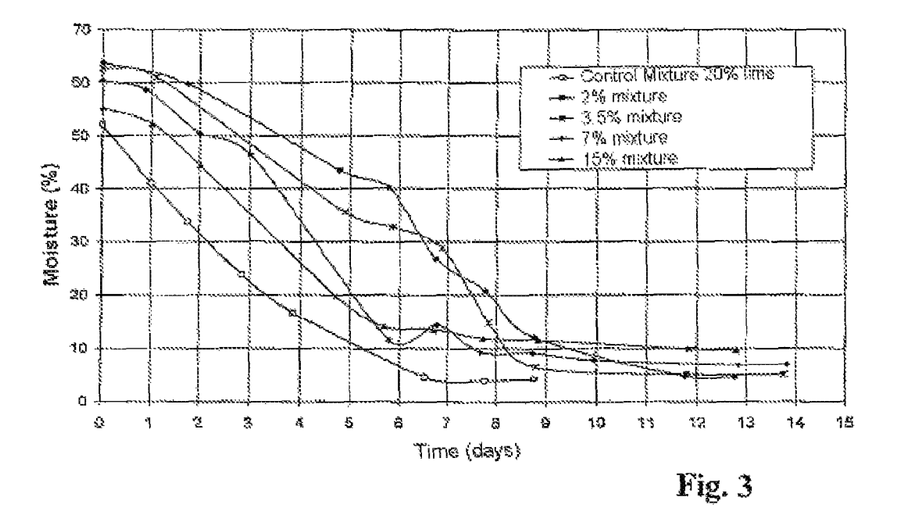
FIG. 3 shows the change in moisture level of a sediment treated by the method of the present invention, as a function of setting time.

The introduction of only 7% of this treatment composition gives a treated sediment whose plot of variation (cf. FIG. 3, black squares) in texture is much higher than the plot obtained with 20% quick lime. This result shows that the treatment composition according to the invention is capable of replacing the lime in proportions which are three times smaller.

It has been observed that the threshold of "manipulability" of a treated sediment is close to a measured texture value corresponding to at least 6 newtons approximately.

EXAMPLE 3

According to the same procedure as Example 2, the same sample of sediment was treated with different proportions of treatment composition according to the invention, in comparison with the 20% lime.

It is found (see FIG. 3) that the sediment treated with the compositions according to the invention dries less quickly than with the quick lime, but, after 6 hours, for proportions of treatment compositions at 7% and 15%, its moisture content is less than 15%.

After 8 hours, all of the samples treated have a moisture content (measured after drying in an oven at 105° C.) of close to 10%, or less.

Taking into account the fact that the target dryness (for achieving effective manipulability) is reached for a moisture percentage of less than 10%, by comparison with the quick lime at 20%, the formulations produced in accordance with the invention all offer the possibility of reaching this dryness very rapidly.

Treatment by the method according to the invention allows the same level of performance as with the lime to be obtained, in proportions which are three times smaller, and results, moreover, in mixtures which are more homogeneous, without any inclusion of unreacted binder, in contrast to the quick lime.

EXAMPLE 4

We tested different formulas of treatment composition on a sediment containing 59% of free water.

The weight proportions between the sediment, 93%, and the treatment composition, 7%, are kept constant.

The test compositions are collated in Table 5 below. The results obtained are shown in FIG. 4, which shows the penetration force of the probe of the texturometer (N) as a function of contact time of the sediment with the treatment composition.

TABLE 5

| Composition | Component | % by weight |
|---|---|---|
| F6 | Sulphoaluminate clinker | 99% |
|  | $Li_2CO_3$ | 1% |
| F8 | Sulphoaluminate clinker | 30.7 |
|  | Anhydrite | 32.9 |
|  | CEM I | 36.3 |
|  | $Li_2CO_3$ | 0.1 |
| F9 | Sulphoaluminate clinker | 30.5 |
|  | Anhydrite | 32.6 |
|  | CEM I | 35.9 |
|  | $Li_2CO_3$ | 1 |
| F10 | Sulphoaluminate clinker | 84 |
|  | Anhydrite | 15 |
|  | $Li_2CO_3$ | 1 |
| F11 | Sulphoaluminate clinker | 84.9 |
|  | Anhydrite | 15 |
|  | $Li_2CO_3$ | 0.1 |
| F12 | Sulphoaluminate clinker | 30.7 |
|  | Anhydrite | 32.9 |
|  | CEM III | 36.3 |
|  | $Li_2CO_3$ | 0.1 |
| F13 | Sulphoaluminate clinker | 30.5 |
|  | Anhydrite | 32.6 |
|  | CEM III | 35.9 |
|  | $Li_2CO_3$ | 1 |

The results are fairly conclusive with regard to the justification of a treatment at 7% with an appropriate hydraulic composition (type F10), and indicate that the catalytic effect of the lithium carbonate is better at 1% by weight.

The preferred treatment composition here is F10, containing 15% of sulphate (anhydrite) and 1% of catalyst. The reaction with the clinker and the sulphate produces ettringite, which mobilizes much more water than the clinker alone (F6).

The results of FIG. 4 also show that:

for combinations of a sulphoaluminate clinker+CEM III, in a mixture with anhydrite, even in the presence of catalyst at 1% by weight (compositions F12 and F13), the texture is much lower than that obtained with the lime at 20%;

the combination of sulphoaluminate clinker with the CEM I, in a mixture with anhydrite, is effective, with slower kinetics (compositions F8 and F9 relative to compositions F10 and F11).

EXAMPLE 5: COMPARATIVE

Tests carried out with the CEM I cement in place of the sulphoaluminate clinker proved to be fruitless: the texturometer at 24 hours did not reach half the value obtained with the sulphoaluminate clinker.

Optimization of the Formula of the Treatment Composition

Figure 5:
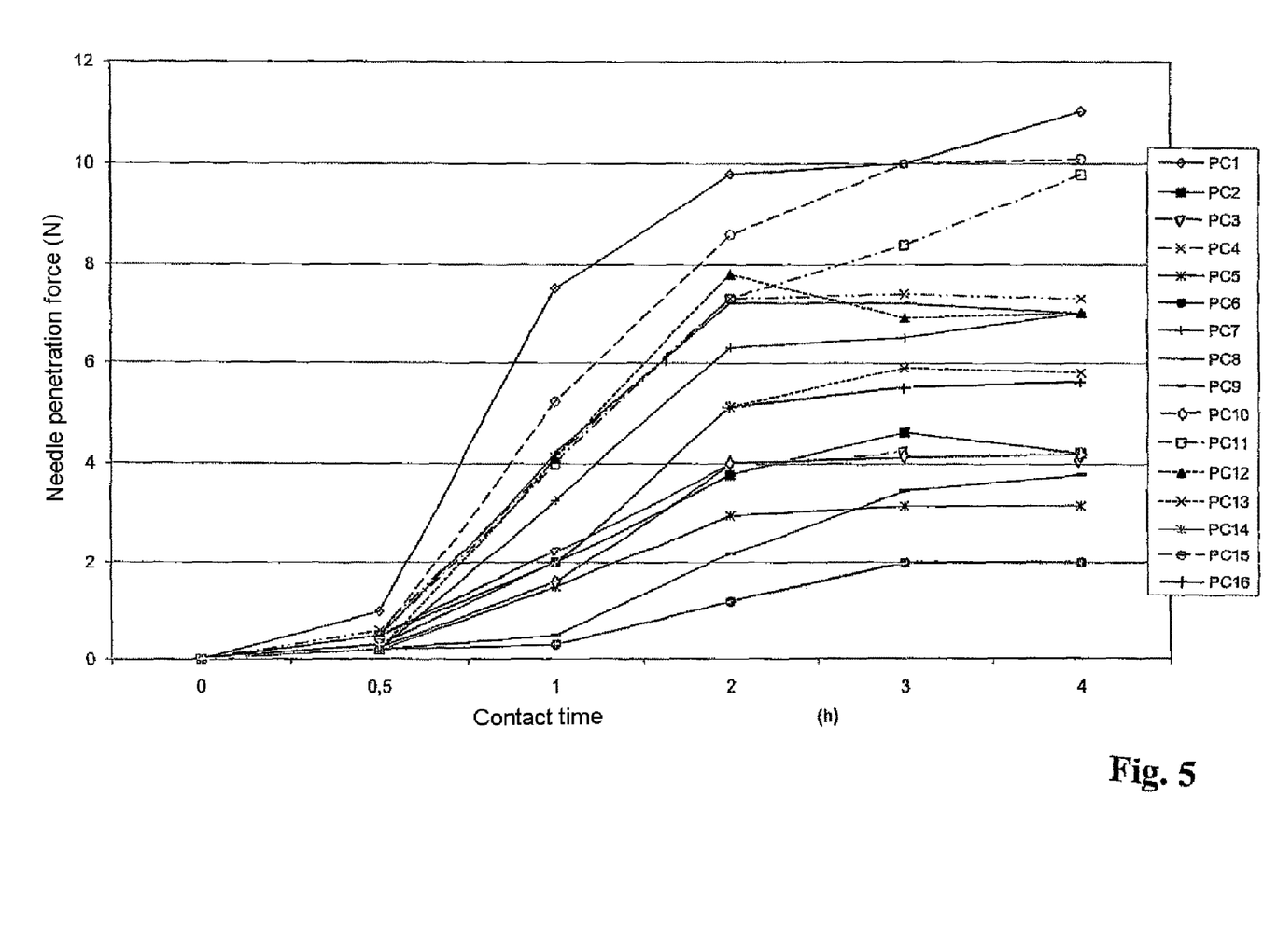
FIG. 5 is a collection of plots showing the comparative development of texture (force in newtons) of a sediment treated with different treatment compositions, as a function of contact time.

Formulas PC1 to PC16, tested at a proportion of 7% relative to the sediment, are shown in Table 6 below, the results in FIG. 5.

TABLE 6

| | Components | (% by weight) |
|---|---|---|
| PC1 | Sulphoaluminate CK | 84.76 |
| | Anhydrite | 14.96 |
| | $Li_2CO_3$ | 0.29 |
| PC2 | Sulphoaluminate CK | 49.33 |
| | Anhydrite | 50.34 |
| | $Li_2CO_3$ | 0.33 |
| PC3 | Sulphoaluminate CK | 49.25 |
| | Anhydrite | 50.25 |
| | $Li_2CO_3$ | 0.5 |
| PC4 | Sulphoaluminate CK | 72.99 |
| | Anhydrite | 26.77 |
| | $Li_2CO_3$ | 0.25 |
| PC5 | Sulphoaluminate CK | 49.41 |
| | Anhydrite | 50.42 |
| | $Li_2CO_3$ | 0.17 |
| PC6 | Sulphoaluminate CK | 73.16 |
| | Anhydrite | 26.84 |
| | $Li_2CO_3$ | 0 |
| PC7 | Sulphoaluminate CK | 72.81 |
| | Anhydrite | 26.7 |
| | $Li_2CO_3$ | 0.49 |
| PC8 | Sulphoaluminate CK | 85 |
| | Anhydrite | 15 |
| | $Li_2CO_3$ | 0 |
| PC9 | Sulphoaluminate CK | 61.33 |
| | Anhydrite | 38.67 |
| | $Li_2CO_3$ | 0 |
| PC10 | Sulphoaluminate CK | 61.2 |
| | Anhydrite | 38.59 |
| | $Li_2CO_3$ | 0.21 |
| PC11 | Sulphoaluminate CK | 84.52 |
| | Anhydrite | 14.91 |
| | $Li_2CO_3$ | 0.57 |
| PC12 | Sulphoaluminate CK | 72.63 |
| | Anhydrite | 26.64 |
| | $Li_2CO_3$ | 0.73 |
| PC13 | Sulphoaluminate CK | 60.95 |
| | Anhydrite | 38.43 |
| | $Li_2CO_3$ | 0.62 |
| PC14 | Sulphoaluminate CK | 49.49 |
| | Anhydrite | 50.51 |
| | $Li_2CO_3$ | 0 |
| PC15 | Sulphoaluminate CK | 84.28 |
| | Anhydrite | 14.87 |
| | $Li_2CO_3$ | 0.85 |
| PC16 | Sulphoaluminate CK | 61.08 |
| | Anhydrite | 38.51 |
| | $Li_2CO_3$ | 0.41 |

It is evident in particular, by comparing treatment compositions PC14 and PC3, for example, that the presence of the $Li_2CO_3$ "catalyst" allows a doubling in the penetration force of the probe of the texturometer, and hence gives stronger treated sediment.

Below a force value of approximately 4N, the treated sediment is pasty.

EXAMPLE 6

The treated sediment according to Examples 2 and 3 may be subsequently exploited economically by use in concrete or mortar formulations.

Following fractionation, the treated sediment is in the form of solid granules with a size of between a few millimetres and a few centimetres.

This granulated material was subsequently used as a component of a concrete formula (phase 2 of the scheme shown in section 2).

The cement type used was a CEM III NB or C.

To recap, the different CEM III cements are as follows:

A: 35-65% of clinker; 36-65% of blast furnace slag

B: 20-34% of clinker; 66-80% of blast furnace slag

C: 5-19% of clinker; 81-95% of blast furnace slag

In the concrete formulas according to the present invention, the range of use is preferably as follows:

Cement: between 200 and 500 kg/m$^3$ of concrete

Sediment: between 0 and 50% of pretreated sediment

Granules: approximately 45% w/c (water/cement)=0.3 to 0.7

The concrete produced in this example has the following standard formula (percentages by total weight of concrete):

30% of pretreated sediment (or 650 kg per 1 m$^3$ of concrete)

15.3% of CEM III A cement (or 350 kg per 1 m$^3$ of concrete)

w/c=0.6

45.80% of granules (or 1049 kg per 1 m$^3$ of concrete)

All of the constituents are mixed in accordance with standard NF EN 196-1 (Cement testing methods—part 1: Determination of mechanical strengths).

The test specimens used to determine the strength of mortars are produced in moulds of (4×4×16) cm$^3$, that of the concretes in moulds of (16 cm in diameter and 32 cm in height), and are kept for 24 to 48 h at 95% humidity after milling. Following demoulding, the mortars and concretes are kept in water at 20° C. prior to measurement.

Each test specimen undergoes a flexural test and compression test.

The pieces are subsequently crushed and the particle size is taken to below 4 mm, as stipulated by the leaching standard NF EN ISO 12457-2 (Characterization of waste—Leaching—Compliance test for leaching of fragmented waste materials and sludges, Part 2: one-stage batch test at an L/S ratio=10 and a particle size of less than 4 mm). After leaching, measurements were made of the various parameters defined in Directive 2003/33/CE of 19 Dec. 2002.

The first results on mortar test specimens are set out in Table 7 below:

TABLE 7

| | Classes according to European Directive 2003/33/CE | | | Crude sediment | Control mortar | Mortar (based on CEM III + 30% of preteated sediment at 3.5%) | Concrete (based on CEM III + 18% of pretreated sediment at 7%) |
|---|---|---|---|---|---|---|---|
| | III | II | I | | 28 d | Interval 28 d | 7 d |
| Compressive strength (MPa) | | | | | 41.32 | 9.29 | 6.1 |
| pH | | | | 5.5 | 12.2 | 12 | 10 |
| Soluble fraction | 0.4 | 6 | 10 | 6.94 mg/l | 0.72 mg/l | 0.76 mg/l | 0.84 mg/l |
| in µg/kg of DM | | | | | | | |
| As | 500 | 2000 | 25000 | 106.68 | <200 | <200 | <200 |
| Ba | 20000 | 100000 | 300000 | 45.15 | 3399 | 1227.22 | 1812.55 |
| Cd | 40 | 1000 | 5000 | <1 | <1 | <1 | <100 |
| Cr | 500 | 10000 | 70000 | <100 | <100 | <100 | <100 |
| Cu | 2000 | 50000 | 100000 | <200 | <200 | 613 | 651.91 |
| Hg | 10 | 200 | 2000 | <1 | <1 | <1 | <100 |
| Mo | 500 | 10000 | 30000 | 91 | <100 | 218 | 160.37 |
| Ni | 400 | 10000 | 40000 | <100 | <100 | <100 | 188.86 |
| Pb | 500 | 10000 | 50000 | <100 | <100 | <100 | <100 |
| Sb | 60 | 700 | 5000 | 0.47 | 0.5 | 1.22 | <200 |
| Se | 100 | 500 | 7000 | 7.01 | 10 | 26.84 | <200 |
| Zn | 4000 | 50000 | 200000 | <200 | <200 | <200 | <200 |
| in mg/kg of DM | | | | | | | |
| Cl$^-$ | 800 | 15000 | 25000 | 11123 | 5 | 630 | 1301 |
| F$^-$ | 10 | 150 | 500 | <0.4 | 5 | 6.41 | 9 |
| SO$_4^-$ | 1000 | 20000 | 50000 | 1985 | 160 | 428 | 1621 |
| Phenol | 1 | — | — | | <0.025 | <0.025 | — |

The mortars and concretes thus formulated have mechanical and chemical characteristics which meet the specifications of the intended application, and in particular of class III (with the exception of the soluble fraction, which is in class II) of Directive 2003/33/CE of 19 Dec. 2002, which defines the criteria and procedures for acceptance of wastes in landfills.

In particular, the leachable fraction is less than 1% by weight. This concrete therefore effectively retains heavy metals.

The invention claimed is:

1. A method of treating marine or river dredging sediments whose free water content is between 40% and 80% by weight, for the purpose of obtaining a solid material which is easy to handle, comprising the successive steps of:
   mixing said sediments with a treatment composition to form a mixture, said treatment composition comprising a sulphoaluminate binder and at least one other component selected from a sulphate source and a catalyst for hydration reactions of the sulphoaluminate binder,
   a step of setting said mixture to form a compact mixture having a free water content of less than 20% by weight, and
   fractionating said compact mixture to form a treated sediment.

2. The method according to claim 1, wherein the treatment composition comprises a sulphoaluminate binder, a sulphate source and a catalyst for hydration reactions of said sulphoaluminate binder.

3. The method according to claim 1, wherein the treatment composition comprises a sulphoaluminate binder and a sulphate source.

4. The method according to claim 1, wherein the treatment composition comprises a sulphoaluminate binder and a catalyst for hydration reactions of said sulphoaluminate binder.

5. The method according to claim 1, wherein the sulphoaluminate binder is a sulphoaluminate clinker comprising as a major phase ye'elimite C4 A3 $.

6. The method according to claim 5, wherein the sulphoaluminate clinker contains from 40% to 80% by weight of ye'elimite C4 A3 $, from 5% to 15% by weight of C$ and from 15% to 25% by weight of belite C2S.

7. The method according to claim 1, wherein the sulphate source is a calcium sulphate selected from the group consisting of anhydrite, gypsum and bassanite (calcium sulphate hemihydrate).

8. The method according to claim 1, wherein the catalyst is a lithium salt.

9. The method according to claim 1, wherein the treatment composition comprises, in percent by weight:
   from 49% to 90% of sulphoaluminate clinker,
   from 9% to 51% of calcium sulphate, and
   up to 1% of a lithium salt.

10. The method according to claim 1, wherein the treatment composition is added to said sediment in proportions of between 1% and 20% by weight of said sediment.

11. The method according to claim 1, wherein the duration of the setting step is between 1 and 7 days approximately, the treated sediment after fractionation being in the form of solid granules containing a free water content of less than 10% by weight and with a texture, measured by means of a texturometer equipped with a 3 mm$^2$ cylindrical probe, having a value of at least 10 newtons.

12. The method according to claim 1, wherein the treated sediment is subsequently introduced into a concrete or mortar composition.

13. The method according to claim 2, wherein the sulphoaluminate binder is a sulphoaluminate clinker comprising as a major phase ye'elimite C4 A3 $.

14. The method according to claim 3, wherein the sulphoaluminate binder is a sulphoaluminate clinker comprising as a major phase ye'elimite C4 A3 $.

15. The method according to claim 4, wherein the sulphoaluminate binder is a sulphoaluminate clinker comprising as a major phase ye'elimite C4 A3 $.

16. The method according to claim 2, wherein the sulphate source is a calcium sulphate selected from the group consisting of anhydrite, gypsum and bassanite (calcium sulphate hemihydrate).

17. The method according to claim 3, wherein the sulphate source is a calcium sulphate selected from the group consisting of anhydrite, gypsum and bassanite (calcium sulphate hemihydrate).

18. The method according to claim 8, wherein the lithium salt is a soluble salt selected from the group consisting of lithium carbonate, sulphate and nitrate.

19. The method according to claim 9, wherein the treatment composition comprises, in percent by weight:
from 80% to 90% of sulphoaluminate clinker,
from 12% to 20% of calcium sulphate, and
from 0.20% to 0.90% of a lithium salt.

20. The method according to claim 10, wherein the treatment composition is added to said sediment in proportions of between 2% and 15% by weight of said sediment.

21. The method according to claim 11, wherein the treated sediment after fractionation in the form of solid granules has a texture, measured by means of a texturometer equipped with a 3 mm$^2$ cylindrical probe, having a value of at least 15 newtons.

22. A concrete or mortar comprising a sediment treated in accordance with the method according to claim 1.

23. The concrete or mortar according to claim 22, wherein the treated sediment is present in an amount up to 50% by weight of the concrete or mortar.

24. The concrete or mortar according to claim 23, wherein the concrete or mortar is prepared from 10% to 30% by weight of treated sediment and from a CEM III cement and the concrete or mortar has a leachable fraction of less than 1% by weight.

* * * * *